(12) United States Patent
Duan

(10) Patent No.: US 8,719,237 B2
(45) Date of Patent: May 6, 2014

(54) METHOD AND APPARATUS FOR DELETING DUPLICATE DATA

(71) Applicant: Huawei Technologies Co., Ltd., Guangdong (CN)

(72) Inventor: Yumei Duan, Shenzhen (CN)

(73) Assignee: Huawei Technologies Co., Ltd. (CN)

( * ) Notice: Subject to any disclaimer, the term of this patent is extended or adjusted under 35 U.S.C. 154(b) by 0 days.

(21) Appl. No.: 13/871,754

(22) Filed: Apr. 26, 2013

(65) Prior Publication Data

US 2013/0297570 A1 Nov. 7, 2013

Related U.S. Application Data

(63) Continuation of application No. PCT/CN2012/075082, filed on May 4, 2012.

(51) Int. Cl.
*G06F 17/30* (2006.01)
(52) U.S. Cl.
CPC ............................. *G06F 17/30156* (2013.01)
USPC ........................................................ 707/692
(58) Field of Classification Search
USPC ......... 707/759–770, 662–664, 666, 669, 692; 711/103, 202, 209, 216
See application file for complete search history.

(56) References Cited

U.S. PATENT DOCUMENTS

| | | | |
|---|---|---|---|
| 8,086,799 B2 * | 12/2011 | Mondal et al. | 711/116 |
| 8,204,867 B2 * | 6/2012 | Benhase et al. | 707/692 |
| 8,346,736 B2 * | 1/2013 | Haustein et al. | 707/692 |
| 8,510,415 B2 * | 8/2013 | Xue et al. | 709/219 |
| 2009/0271502 A1 * | 10/2009 | Xue et al. | 709/219 |
| 2011/0016095 A1 | 1/2011 | Anglin | |
| 2011/0307456 A1 | 12/2011 | Jayaraman | |
| 2013/0073522 A1 * | 3/2013 | Chen et al. | 707/687 |

FOREIGN PATENT DOCUMENTS

| | | |
|---|---|---|
| CN | 101599079 A | 12/2009 |
| CN | 101706825 A | 5/2010 |
| CN | 101814045 A | 8/2010 |
| WO | 2010033962 A1 | 3/2010 |

OTHER PUBLICATIONS

Yunhe Weng et al., Semantic Keywords-Based Duplicated Web Pages Removing, 2008, IEEE, 7 Pages.*
Search report and written opinion issued in corresponding PCT application No. PCT/CN2012/075082, dated Feb. 28, 2013, total 10 pages.

* cited by examiner

*Primary Examiner* — Jean B Fleurantin
(74) *Attorney, Agent, or Firm* — Huawei Technologies Co., Ltd.

(57) ABSTRACT

Present invention provides a method and an apparatus for deleting duplicate data. The method include: receiving a modified data block for a user file stored in the data storage system; querying whether the modified data block is found in the system data block file; if the modified data block is not found in the system data block file, adding the modified data block to the system data block file, and updating an index relationship of the user file with the system data block file to include an index pointing to the modified data block added in the system data block file. With the method and apparatus for deleting duplicate data provided by embodiments of the present invention, the duplicate data after modification is deleted, which improves the performance in modifying other data block files and improves the effect of deleting the duplicate data.

8 Claims, 3 Drawing Sheets

METHOD AND APPARATUS FOR DELETING DUPLICATE DATA

CROSS-REFERENCE TO RELATED APPLICATIONS

This application is a continuation of International Application No. PCT/CN2012/075082, filed on May 4, 2012, which are hereby incorporated by reference in their entireties.

FIELD OF THE INVENTION

Embodiments of the present invention relate to data storage technologies, and in particular, to a method and an apparatus for deleting duplicate data.

BACKGROUND OF THE INVENTION

With the development of globalization and information technologies, enterprise data is witnessing an explosive growth, and the redundancy of the enterprise data is increasing. The technology for deleting duplicate data is a data reduction technology for reducing the storage space of redundant data in a storage system.

In a method for deleting duplicate data in the prior art, a user file is generally divided into multiple data blocks; for those duplicate data blocks, only one data block is reserved and recorded in a data block file; an index relationship between the user file and the data block file is established to delete the duplicate data. Before the user file is modified, a modified file corresponding to the user file needs to be set up, and the modified data block is recorded in the modified file; and an index between the modified user file and the modified file is set up. That is, the index of the modified user file includes two types: index pointing to the data block file and index pointing to the modified file. Because the modified file corresponds to the user file, a large number of modified files may be generated when a large number of user files are modified. When the number of modified files reaches a specific degree, the deletion rate of duplicate data is greatly reduced and the performance in modifying other user files is also affected.

SUMMARY OF THE INVENTION

Embodiments of the present invention provide a method and an apparatus for deleting duplicate data to avoid the problem of a low deletion rate of duplicate data due to too many modified files, thereby improving the effect of deleting duplicate data.

An embodiment of the present invention provides a method for deleting duplicate data, including:

querying whether a data block file has a data block that is the same as a modified data block, and generating a query result, where the data block file includes at least one data block and the modified data block is a data block modified after duplicate data is deleted previously;

when it is identified, according to the query result, that the data block file has a data block that is the same as the modified data block, updating an index of the modified data block according to the data block file; and when it is identified, according to the query result, that the data block file has no data block that is the same as the modified data block, adding the modified data block to the data block file, and updating the index of the modified data block according to the data block file to which the modified data block is added.

An embodiment of the present invention provides an apparatus for deleting duplicate data, including:

a querying module, configured to query whether a data block file has a data block that is the same as a modified data block, and generate a query result, where the data block file includes at least one data block and the modified data block is a data block modified after duplicate data is deleted previously;

a first processing module, configured to, when it is identified, according to the query result, that the data block file has a data block that is the same as the modified data block, update an index of the modified data block according to the data block file; and a second processing module, configured to, when it is identified, according to the query result, that the data block file has no data block that is the same as the modified data block, add the modified data block to the data block file, and update the index of the modified data block according to the data block file to which the modified data block is added.

According to the above technical solutions, by using the method and apparatus for deleting duplicate data provided by the embodiments of the present invention, a data block file is queried to determine whether it has a data block that is the same as a modified data block; if the data block file has a data block that is the same as the modified data block, the index of the modified data block is updated according to the data block file; if the data block file has no data block that is the same as the modified data block, the modified data block is added to the data block file, and the index of the modified data block is updated according to the data block file to which the modified data block is added. If the data block file already has a data block that is the same as the modified data block, the index of the modified data block is directly modified to delete the duplicate data after modification. If the modified data block is a new data block, the modified data block is added to the data block file, and the index of the modified data block is updated, without the need of creating a new modified file. This solves the problem of a low deletion rate of duplicate data due to too many modified files, enhances the performance in modifying other data blocks, improves the effect of deleting the duplicate data, and saves more space.

BRIEF DESCRIPTION OF THE DRAWINGS

To illustrate the technical solutions in the embodiments of the present invention or in the prior art more clearly, the following briefly describes the accompanying drawings required for describing the embodiments or the prior art. Apparently, the accompanying drawings in the following description merely show some embodiments of the present invention, and persons of ordinary skill in the art can derive other drawings from these accompanying drawings without creative efforts.

DETAILED DESCRIPTION OF THE EMBODIMENTS

To make the objectives, technical solutions, and advantages of the present invention more comprehensible, the following clearly and completely describes the technical solutions according to the embodiments of the present invention with reference to the accompanying drawings in the embodiments of the present invention. Apparently, the embodiments in the following description are merely a part rather than all of the embodiments of the present invention. All other embodiments obtained by a person of ordinary skill in the art based on the embodiments of the present invention without creative efforts shall fall within the protection scope of the present invention.

Embodiment 1

Figure 1:
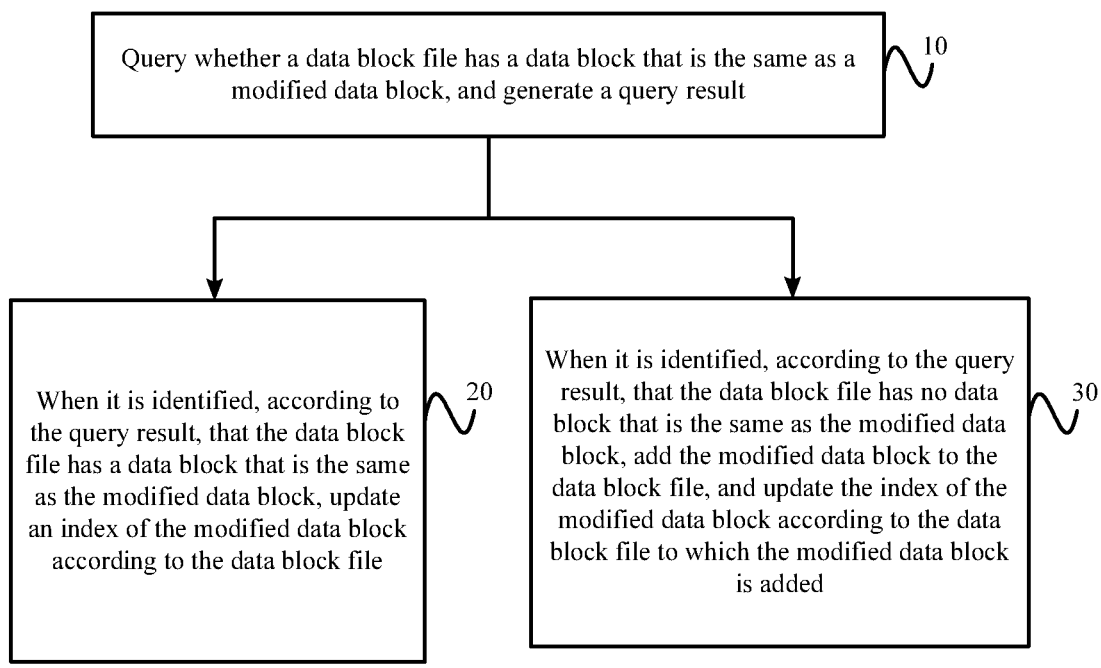
FIG. 1 is a flowchart of a method for deleting duplicate data according to Embodiment 1 of the present invention.

FIG. 1 is a flowchart of a method for deleting duplicate data according to Embodiment 1 of the present invention. As shown in FIG. 1, the method for deleting duplicate data provided in this embodiment may be applied in a processing of deleting duplicate data in a storage system and may be executed by an apparatus for deleting duplicate data. The apparatus for deleting duplicate data may be integrated in the storage system or be set independently. Specifically, data in the storage system may be provided to a user in the form of a user file; if the data in the storage system is not processed, when the user browses the user file, the user reads data corresponding to the user file directly from the storage system and the data is displayed to the user; when the user modifies the data in the user file, the user modifies the data corresponding to the user file in the storage system directly. When deleting the duplicate data in the storage system, the data may be divided into multiple data blocks firstly. The data may be divided by using a fixed-length block division manner or a variable-length block division manner. In the fixed-length block division manner, the sizes of data blocks are all preset sizes; in the variable-length block division manner, the data may be divided into blocks according to the content of data, and data with associated content is grouped into a data block, to improve the integrity of the data block. For duplicate data blocks, only one of the data blocks is reserved and recorded in a data block file, and an index relationship between a user file and a data block file is set up. The format of the index relationship may include the following key fields.

| Data block No. | Data block file ID | Offset | Length |
| --- | --- | --- | --- |

Specifically, there are multiple data block files, and a unique ID may be assigned to each data block file. The offset is used to indicate the initial position of a data block in the data block file, and the length is used to indicate the length of a data block. A single instance repository may be set up to manage the multiple data block files.

When the user browses the user file, the user may read data from the data block file according to the index relationship between the user file and the data block file, and the data is displayed to the user. Therefore, for the user, the data browsed by the user before and after duplicate data is deleted is the same. When the user modifies the data in the user file, the user may adopt the method for deleting duplicate data provided in this embodiment.

The method for deleting duplicate data provided in this embodiment specifically includes:

Step 10: Query whether a data block file has a data block that is the same as a modified data block, and generate a query result, where the data block file includes at least one data block and the modified data block is a data block modified after duplicate data is deleted previously.

Modifying the user file by the user is specifically modifying a data block in the user file, and the data block modified by the user is the modified data block. The data block file is queried according to the modified data block. Specifically, when there are multiple data block files, each data block file needs to be queried to determine whether the data block file has a data block that is the same as a modified data block; if the data block file has a data block that is the same as the modified data block, a query result for indicating that the data block file has a data block that is the same as the modified data block is generated; the data block file has no data block that is the same as the modified data block, a query result for indicating that the data block file has no data block that is the same as the modified data block is generated.

Step 20: When it is identified, according to the query result, that the data block file has a data block that is the same as the modified data block, update an index of the modified data block according to the data block file.

Before the index of the modified data block is updated, the index points to a data block that is the same as the data block before modification in the data block file; if the data block file has a data block that is the same as the modified data block, the index of the modified data block is updated to point to the data block that is the same as the modified data block in the data block file.

Step 30: When it is identified, according to the query result, that the data block file has no data block that is the same as the modified data block, add the modified data block to the data block file, and update the index of the modified data block according to the data block file to which the modified data block is added.

If the data block file has no data block that is same as the modified data block, the modified data block is added to the data block file, and the index of the modified data block is updated to point to the data block that is the same as the modified data block in the data block file, that is, a newly added data block.

It should be noted that step 20 and step 30 are only processing ways that direct to different query results, respectively, and are not subject to a specific sequence.

With the method for deleting duplicate data provided in this embodiment, a data block file is queried to determine whether it has a data block that is the same as the modified data block; if the data block file has a data block that is the same as the modified data block, the index of the modified data block is updated according to the data block file; and if the data block file has no data block that is the same as the modified data block, the modified data block is added to the data block file, and the index of the modified data block is updated according to the data block file to which the modified data block is added. If the data block file already has a data block that is the same as the modified data block, the index of the modified data block is directly modified to delete the duplicate data after modification. If the modified data block is a new data block, the modified data block is added to the data block file, and the index of the modified data block is updated, without the need of creating a new modified file. This solves the problem of a low deletion rate of duplicate data due to too many modified files, enhances the performance in modifying other data blocks, improves the effect of deleting the duplicate data, and saves more space.

Embodiment 2

Figure 2:
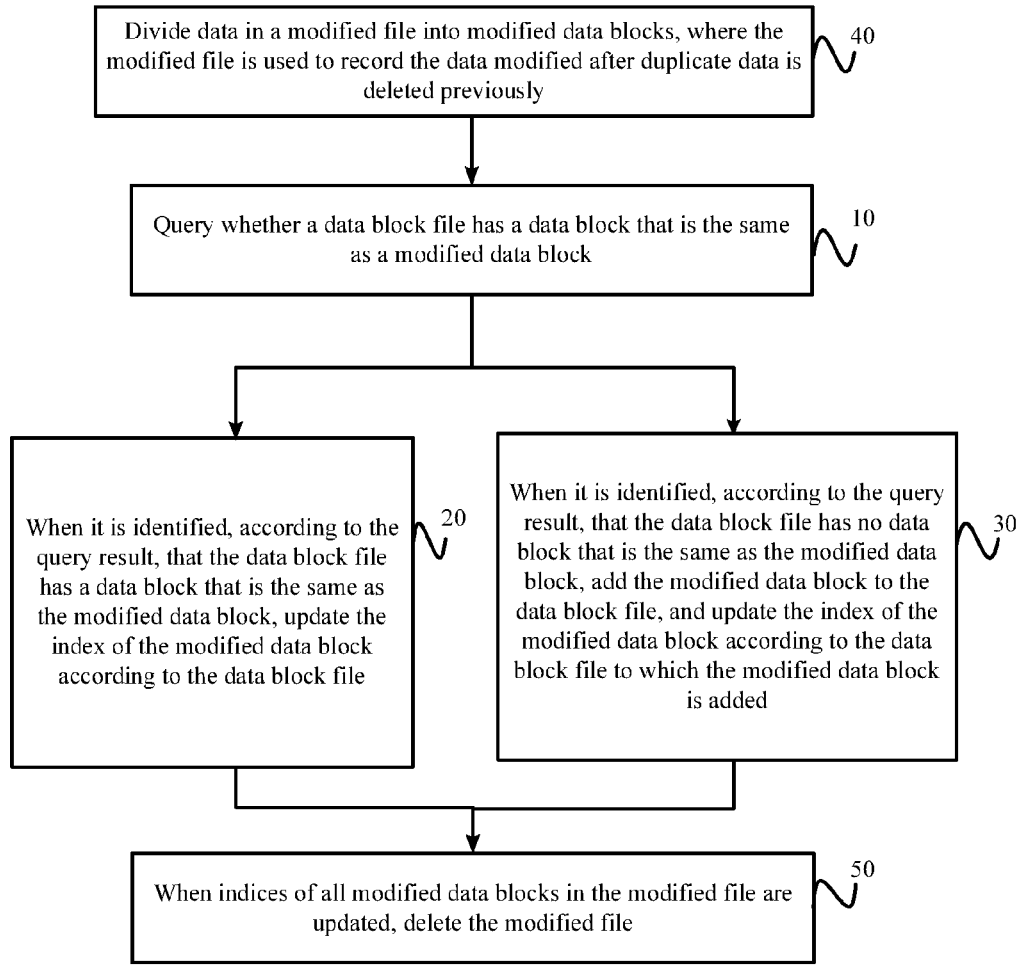
FIG. 2 is a flowchart of a method for deleting duplicate data according to Embodiment 2 of the present invention.

FIG. 2 is a flowchart of a method for deleting duplicate data according to Embodiment 2 of the present invention. As shown in FIG. 2, the method for deleting duplicate data provided in this embodiment is based on the embodiment shown in FIG. 1. Before querying a data block file according to a modified data block and generating a query result in the step 10, the following steps may be further included:

Step 40: Divide data in a modified file into modified data blocks, where the modified file is used to record the data modified after duplicate data is deleted previously.

Specifically, in practical use, when a user file is modified, the modified data may be recorded in a modified file corresponding to the user file, and an index relationship between the user file and the modified file is set up. The index relationship may be recorded individually or may be extended on the basis of an index relationship between a user file and a data block file. For example, the identifier of the data block file in the index relationship is set to 0 to indicate that a data block is a modified data block and its corresponding record exists in a modified file.

The data in the modified file is divided into multiple data blocks, so that the data blocks are the above modified data blocks. Similarly, the data in the modified file may be divided by using a fixed-length block division manner or a variable-length block division manner. The data block file is queried according to the modified data block; if the data block file has a data block that is the same as the modified data block, the index of the modified data block is updated according to the data block file; if the data block file has no data block that is the same as the modified data block, the modified data block is added to the data block file, and the index of the modified data block is updated according to the data block file to which the modified data block is added.

Accordingly, after the index of the modified data block is updated, the following step is further included:

Step 50: When indices of all modified data blocks in the modified file are updated, delete the modified file.

Specifically, updating the index of the modified data block may be the step of updating an index in step 20 or may be the step of updating an index in step 30.

When the data block file has a data block that is the same as the modified data block, the index pointing to the modified file is updated to point to the data block file; when the data block file has no data block that is the same as the modified data block, after the modified data block is added to the data block file, the index pointing to the modified file is updated to point to the data block file and the index relationship between the user file and the modified file is updated to the index relationship between the user file and the data block file. In this way, the data of the modified file is deleted. The space occupied by the modified file is released by deleting the modified file, so as to further improve the efficiency in deleting duplicate data and enhances the performance in modifying other data block files.

The method for deleting duplicate data provided in this embodiment may be specifically applied in the data sorting of the modified file. That is, the modified data may be recorded in the modified file, and then the duplicate data of the modified file is deleted off line, so as to avoiding occupying resources when the user modifies data.

Further, in this embodiment, in step 40, the dividing the data in the modified file into modified data blocks may include the following steps:

obtaining continuous modified data from the modified file; if the size of the continuous modified data is greater than a preset threshold, dividing the continuous modified data into at least two modified data blocks according to the preset threshold; if the size of the continuous modified data is not greater than a preset threshold, using the continuous modified data as one modified data block.

The continuous modified data is a segment of contiguous data corresponding to the user file. The continuous modified data serves as the basis for dividing modified data blocks, which can avoid a case that the same data blocks cannot be queried for when scattered modified data is grouped into one data block, thereby improving the effect of matching duplicate data.

In this embodiment, the querying the data block file according to the modified data block and generating a query result in step 10, may include the following steps:

calculating a Hash value of the modified data block, matching the Hash value of the modified data block with the Hash value of each obtained data block in the data block file; if the matching succeeds, generating a query result for indicating that the data block file has a data block that is the same as the modified data block; and if the matching fails, generating a query result for indicating that the data block file has no data block that is the same as the modified data block.

Specifically, the Hash value of each data block in all data block files may be calculated in advance and stored in a single instance repository on a unified basis. When a data block that is the same as a modified data block is queried for the modified data block, a Hash value of the modified data block may be calculated, and then the Hash values stored in the single instance repository are queried according to the Hash value. Two data blocks whose Hash values are the same have the same content, that is, the duplicate data. The method for determining duplicate data by matching Hash values is simple and convenient to implement. The process of matching data blocks may also be implemented by using other methods, which is not limited to the method in this embodiment.

In this embodiment, in step 20, before updating the index of the modified data block according to the data block file, the following steps may be further included:

according to the index of the modified data block, decreasing the number of reference times of a data block corresponding to the index in the data block file by 1; if the number of reference times of the data block is decreased to 0, deleting the data block corresponding to the index in the data block file.

In step 20, the updating the index of the modified data block according to the data block file may include the following steps:

according to the data block that is the same as the modified data block in the data block file, updating the index of the modified data block.

After updating the index of the modified data block according to the data block file in step 20, the following steps may be further included:

adding 1 to the number of reference times of the data block that is the same as the modified data block in the data block file.

In step 30, the updating the index of the modified data block according to the data block file to which the modified data block is added may include the following steps:

according to the data block that is the same as the modified data block in the data block file to which the modified data block is added, updating the index of the modified data block;

In step 30, after updating the index of the modified data block according to the data block file to which the modified data block is added, the following steps may be further included:

setting the number of reference times of the data block that is the same as the modified data block in the data block file to which the modified data block is added to 1.

The number of reference times of the data block in the data block file is recorded, so that the reference details of each data block may be reflected; when the number of reference times of a data block is 0, it indicates that the user file has no data pointing to the data block, and the data block in the data block file can be deleted. In this way, the data block file is simplified, and data redundancy in the data block file is avoided.

Embodiment 3

Figure 3:
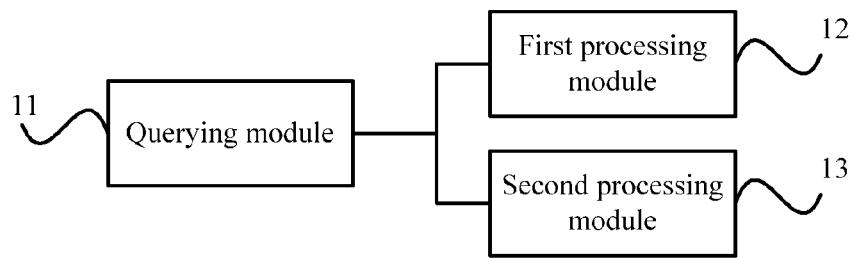
FIG. 3 is a schematic structural diagram of an apparatus for deleting duplicate data according to Embodiment 3 of the present invention.

FIG. 3 is a schematic structural diagram of an apparatus for deleting duplicate data according to Embodiment 3 of the present invention. As shown in FIG. 3, the apparatus for deleting duplicate data provided in this embodiment may implement the steps of the method for deleting duplicate data provided by any embodiment of the present invention, and details are not further described.

The apparatus for deleting duplicate data provided in this embodiment includes a querying module 11, a first processing module 12, and a second processing module 13. The querying module 11 is configured to query whether a data block file has a data block that is the same as a modified data block, and generate a query result, where the data block file includes at least one data block and the modified data block is a data block modified after duplicate data is deleted previously. The first processing module 12 is configured to, when it is identified, according to the query result, that the data block file has a data block that is the same as the modified data block, update an index of the modified data block according to the data block file. The second processing module 13 is configured to, when it is identified, according to the query result, that the data block file has no data block that is the same as the modified data block, add the modified data block to the data block file, and update the index of the modified data block according to the data block file to which the modified data block is added.

With the apparatus for deleting duplicate data provided in this embodiment, the querying module 11 queries whether the data block file has a data block that is the same as the modified data block; if the data block file has a data block that is the same as the modified data block, the first processing module 12 updates the index of the modified data block according to the data block file; and if the data block file has no data block that is the same as the modified data block, the second processing module 13 adds the modified data block to the data block file, and updates the index of the modified data block according to the data block file to which the modified data block is added. If the data block file already has a data block that is the same as the modified data block, the index of the modified data block is directly modified to delete the duplicate data after modification. If the modified data block is a new data block, the modified data block is added to the data block file, and the index of the modified data block is updated, without the need of creating a new modified file. This solves the problem of a low deletion rate of duplicate data due to too many modified files, enhances the performance in modifying other data blocks, improves the effect of deleting the duplicate data, and saves more space.

Embodiment 4

Figure 4:
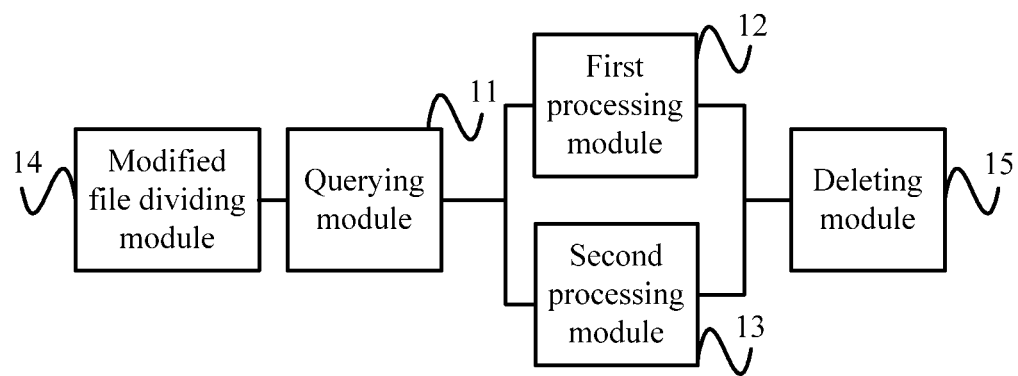
FIG. 4 is a schematic structural diagram of an apparatus for deleting duplicate data according to Embodiment 4 of the present invention.

FIG. 4 is a schematic structural diagram of an apparatus for deleting duplicate data according to Embodiment 4 of the present invention. As shown in FIG. 4, the apparatus for deleting duplicate data provided by this embodiment may further include a modified file dividing module 14 and a deleting module 15 on the basis of the embodiment shown in FIG. 3. The modified file dividing module 14 is configured to divide data in a modified file into modified data blocks, where the modified file is used to record the data modified after duplicate data is deleted previously. The deleting module 15 is configured to, when indices of all modified data blocks in the modified file are updated, delete the modified file. By setting the modified file dividing module 14 and the deleting module 15, the duplicate data of the modified file is deleted; in addition, modified data may be recorded in the modified file, and then the duplicate data of the modified file is deleted off line, so as to avoid occupying resources when a user modifies data.

Further, in this embodiment, the modified file dividing module 14 may be further configured to: obtain continuous modified data from the modified file; if the size of the continuous modified data is greater than a preset threshold, divide the continuous modified data into at least two modified data blocks according to the preset threshold; and if the size of the continuous modified data is not greater than a preset threshold, use the continuous modified data as one modified data block. The continuous modified data serves as a basis for dividing modified data blocks, so as to avoid a case that the same data blocks cannot be queried for when scattered modified data is grouped into one data block, thereby improving the effect of matching duplicate data.

In this embodiment, the querying module 11 may be further configured to: calculate a Hash value of the modified data block, match the Hash value of the modified data block with the Hash value of each data block in the obtained data block file; if the matching succeeds, generate a query result for indicating that the data block file has a data block that is the same as the modified data block; and if the matching fails, generate a query result for indicating that the data block file has no data block that is the same as the modified data block. The method for determining duplicate data by matching Hash values is simple and convenient to implement.

Further, in this embodiment, the first processing module 12 may be further configured to: decrease the number of reference times of a data block corresponding to the index in the data block file by 1 according to the index of the modified data block; if the number of reference times of the data block is decreased to 0, delete the data block corresponding to the index in the data block file, update the index of the modified data block according to the data block that is the same as the modified data block in the data block file, and add 1 to the number of reference times of the data block that is the same as the modified data block in the data block file. The second processing module 13 may be further configured to, according to the data block that is same as the modified data block in the data block file to which the modified data block is added, update the index of the modified data block, and set the number of reference times of the data block that is the same as the modified data block in the data block file to which the modified data block is added to 1. The number of reference times of the data block in the data block file is recorded, so that the reference details of each data block may be reflected; when the number of reference times of a data block is 0, it indicates that a user file has no data pointing to the data block, and the data block in the data block file can be deleted. In this way, the data block file is simplified, and data redundancy in the data block file is avoided.

Persons of ordinary skill in the art should understand that all or part of the steps of the methods in the embodiments may be implemented by a program instructing relevant hardware. The program may be stored in a computer readable storage medium. When the program runs, the above steps of the methods in the embodiments are performed. The storage medium may be any medium capable of storing program codes, such as a ROM, a RAM, a magnetic disk, or a CD-ROM, and the like.

Finally, it should be noted that the above embodiments are merely intended for describing the technical solutions of the present invention other than limiting the present invention. Although the present invention is described in detail with reference to the foregoing embodiments, persons of ordinary skill in the art should understood that they can still make modifications to the technical solutions described in each of the foregoing embodiments, or make equivalent substitutions to some technical features thereof, and such modifications or substitutions cannot make the essence of the corresponding technical solutions depart from the scope of the technical solutions of each embodiment of the present invention.

What is claimed is:

1. A method for storing data in a data storage system with reduced duplication, the data storage system storing a plurality of files each divided into a plurality of data blocks, and maintaining a system data block file containing data blocks uniquely selected from the data blocks of the files, wherein each file has an index relationship with the system data block file, the method being executed by a processor of a device of the data storage system and comprising:
    receiving a modified data block for a user file stored in the data storage system;
    querying whether the modified data block is found in the system data block file, comprising:
    matching a hash value of the modified data block with a hash value of each data block in the system data block file, if the matching succeeds, generating a query result for indicating that the modified data block is found in the system data block file, if the matching fails, generating a query result for indicating that the data block file is not found in the system data block file;
    if the modified data block is not found in the system data block file, adding the modified data block to the system data block file, and updating an index relationship of the user file with the system data block file to include an index pointing to the modified data block added in the system data block file.

2. The method of claim 1, further comprising:
    prior to the step of querying, storing the modified data block into a modified file associated with the user file.

3. The method of claim 2, further comprising:
    after the step of storing, dividing the modified file into the modified data block; and
    after the step of adding the index, deleting the modified file.

4. The method of claim 3, wherein the step of dividing comprises:
    obtaining contiguously modified data from the modified file;
    if a size of the contiguously modified data is greater than a preset threshold, dividing the contiguously modified data into at least two modified data blocks according to the preset threshold; and
    if the size of the contiguously modified data is not greater than a preset threshold, using the contiguously modified data as one modified data block.

5. An apparatus for storing data in a data storage system with reduced duplication, the data storage system storing a plurality of files each divided into a plurality of data blocks, and maintaining a system data block file containing data blocks uniquely selected from the data blocks of the files, wherein each file has an index relationship with the system data block file, the storage apparatus comprising:
    a memory, configured to store computer-executable instructions;
    a processor coupled with the memory, wherein the processor is configured to execute the instructions stored in the memory to carry out operations comprising:
    receiving a modified data block for a user file stored in the data storage system; querying whether the modified data block is found in the system data block file, comprising:
    matching a hash value of the modified data block with a hash value of each data block in the system data block file, if the matching succeeds, generating a query result for indicating that the modified data block is found in the system data block file, if the matching fails, generating a query result for indicating that the data block file is not found in the system data block file;
    if the modified data block is not found in the system data block file, adding the modified data block to the system data block file, and updating an index relationship of the user file with the system data block file to include an index pointing to the modified data block added in the system data block file.

6. The apparatus of claim 5, wherein the processor is further configured to carry out an operation of:
    prior to the operation of querying, storing the modified data block into a modified file associated with the user file.

7. The apparatus of claim 6, the processor is further configured to carry out operations of:
    after the operation of storing, dividing the modified file into the modified data block; and
    after the operation of adding the index, deleting the modified file.

8. The apparatus of claim 7, wherein the operation of dividing comprises:
    obtaining contiguously modified data from the modified file;
    if a size of the contiguously modified data is greater than a preset threshold, dividing the contiguously modified data into at least two modified data blocks according to the preset threshold; and
    if the size of the contiguously modified data is not greater than a preset threshold, using the contiguously modified data as one modified data block.

* * * * *